United States Patent [19]

Tottori et al.

[11] Patent Number: 5,047,127
[45] Date of Patent: Sep. 10, 1991

[54] OZONE GENERATING METHOD

[75] Inventors: Isao Tottori; Masazumi Matsuura; Atsuhiro Fujii, all of Itami, Japan

[73] Assignee: Mitsubishi Denki Kabushiki Kaisha, Japan

[21] Appl. No.: 560,878

[22] Filed: Jul. 31, 1990

[30] Foreign Application Priority Data

Nov. 15, 1989 [JP] Japan .................................. 1-294926

[51] Int. Cl.$^5$ ............................................. C01B 13/10
[52] U.S. Cl. ................................ 204/176; 422/186.07; 422/186.21
[58] Field of Search ....................... 422/186.07, 186.21; 204/176

[56] References Cited

U.S. PATENT DOCUMENTS

| 3,963,625 | 6/1976 | Lowther | 250/533 |
| 3,970,567 | 7/1976 | Lowther | 250/533 |
| 4,100,421 | 7/1978 | Tabata et al. | 250/533 |
| 4,614,573 | 9/1986 | Masuda | 204/176 |
| 4,877,588 | 10/1989 | Ditzler et al. | 422/186.19 |

Primary Examiner—Robert L. Stoll
Assistant Examiner—Nina Bhat
Attorney, Agent, or Firm—Leydig, Voit & Mayer

[57] ABSTRACT

An ozone generating method for increasing the quantity of ozone produced by a silent discharge in high purity oxygen includes mixing nitrogen with the high purity oxygen in a predetermined ratio. The nitrogen gas is a catalyst for stable and highly efficient ozone generation from a high purity oxygen source.

2 Claims, 2 Drawing Sheets

OZONE GENERATING METHOD

BACKGROUND OF THE INVENTION

1. Field of the Invention

The present invention relates to an ozone generating apparatus, and more particularly to an apparatus for generating ozone by mixing oxygen gas and nitrogen gas in a predetermined ratio.

2. Description of the Related Art

FIG. 1 is a partially cutaway schematic view illustrating a portion of a conventional ozone generating apparatus. In this figure, oxygen gas is supplied to a cylindrical discharge tube 1 from an oxygen gas supplying tube 2. In the center of the discharge tube 1 is disposed an electrode 3 for exciting oxygen introduced into the discharge tube 1 and supplying the energy to generate the ozone. The discharge tube 1 to which the oxygen gas supplying tube 2 is connected communicates with a discharge tube 4 adjacent to the oxygen gas supplying tube 2. An ozone discharge tube 5 for discharging generated ozone is connected to the discharge tube 4. Since the discharge tubes 1 and 4 reach high temperatures, their surroundings are cooled by cooling water from a cooling water storage container 6. This container 6 is grounded, and a cooling water input tube 7 and a cooling water discharge tube 8 for inputting and discharging cooling water respectively are provided on the bottom of the container 6.

A conventional ozone generating apparatus is constructed as mentioned above, and silent discharge is performed in the discharge tubes 1 and 4 into which oxygen gas is input. The oxygen gas is excited by this silent discharge and ozone is generated from the excited oxygen. The ozone generated is discharged from the ozone discharge tube 5 together with oxygen gas which has not reacted.

In the ozone generating apparatus mentioned above, where highly pure oxygen gas (purity: 99.95% or more) for use in the manufacture of semiconductors is used as a source gas, the efficiency of the generation of ozone may sometimes fall considerably below that where ordinary bottled oxygen gas (purity: up to 99.95%) is used. Also, where the above-mentioned bottled oxygen gas is used as a source gas, there has been a problem in that the efficiency of the generation of ozone differs depending on the purity of the bottled oxygen gas and stable generation of ozone is thereby rendered impossible.

SUMMARY OF THE INVENTION

The present invention has been devised to solve the above-mentioned problems. An object of the present invention is to provide an ozone generating apparatus which efficiently generates ozone when highly pure oxygen gas is used as the source gas as well as generating ozone at a stable efficiency when bottled high purity oxygen gas is used as the source gas.

In order to achieve the above objects, according to one aspect of the present invention, there is provided an ozone generating method using high purity oxygen gas as a source gas comprising: oxygen gas supply means for supplying high purity oxygen gas to an ozone generating apparatus; and nitrogen gas supply means for supplying nitrogen gas to the apparatus, to produce a mixture having a ratio of the nitrogen gas to the oxygen gas in the range from 0.0002 to 0.02 and producing a silent discharge in the mixture to generate ozone.

These and other objects, features and advantages of the present invention will become clear from the following description of a preferred embodiment of the present invention with reference to the accompanying drawings.

DETAILED DESCRIPTION OF THE PREFERRED EMBODIMENT

Figure 1:
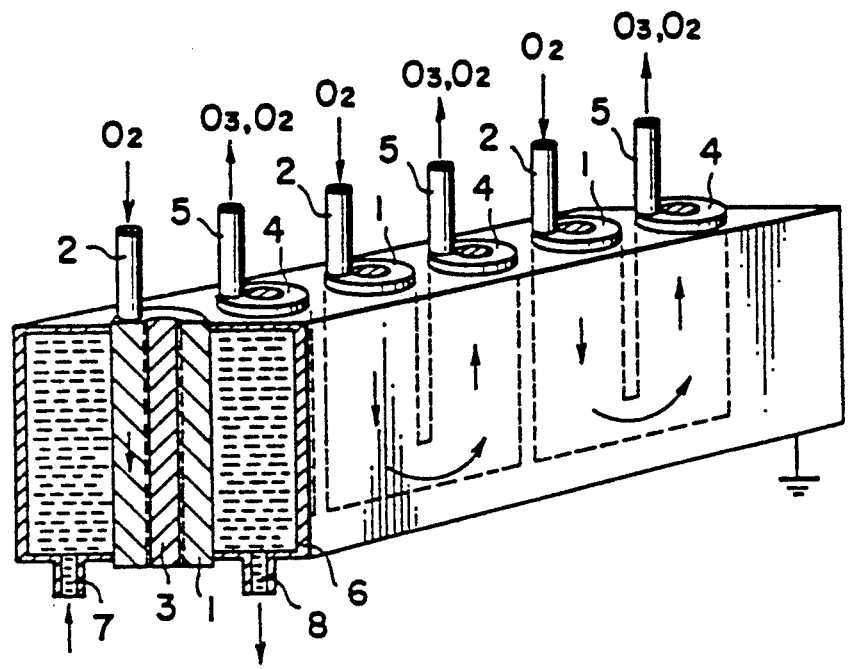
FIG. 1 is a partially cutaway schematic view illustrating an essential portion of a conventional ozone generating apparatus.
Figure 2:
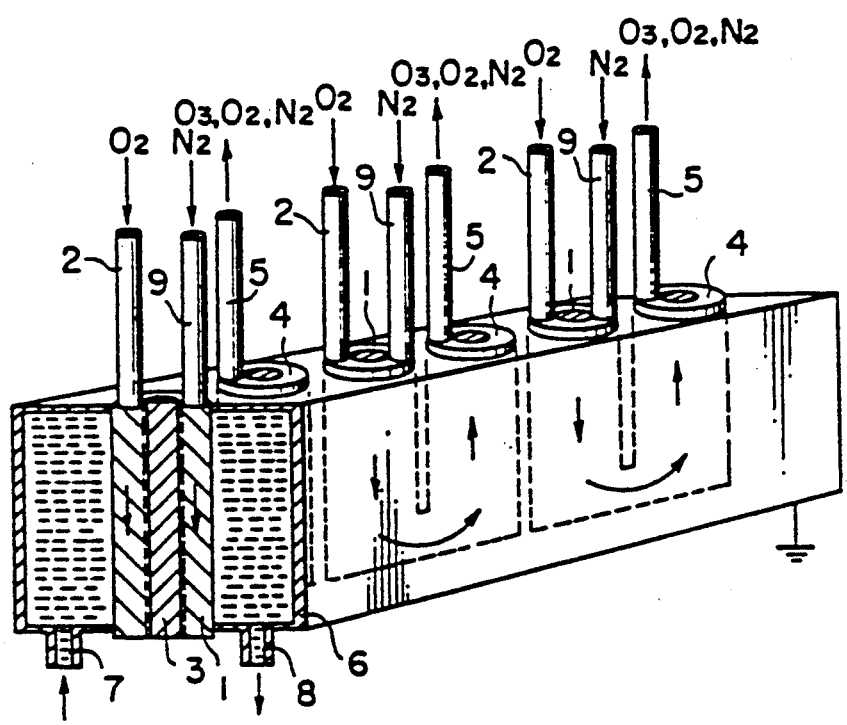
FIG. 2 is a partially cutaway schematic view illustrating an essential portion of an ozone generating apparatus in accordance with one embodiment of the present invention.

FIG. 2 is a schematic view, partly in cross section, illustrating an essential portion of an ozone generating apparatus in accordance with one embodiment of the present invention. In this figure, reference numerals 1 to 8 are the same as those in the above-mentioned conventional ozone generating apparatus. That is, oxygen gas is input into a cylindrical discharge tube 1 from an oxygen gas supply tube 2, which is an oxygen gas supply means, and silent discharge is performed by the electrode 3 positioned in the center of the discharge tube 1.

Nitrogen gas is supplied to the discharge tube 1 from a nitrogen gas supply tube 9, which is the nitrogen gas supply means, provided on the discharge tube 1. The nitrogen gas is mixed with the oxygen gas so that the mixture ratio of oxygen gas: nitrogen gas is 1:0.0002 to 0.02. If the mixture ratio of nitrogen gas to oxygen gas is 0.0002 or less, the effect of improving the efficiency of the generation of ozone is small, and if the nitrogen gas concentration reaches 0.02 or more, the ozone generation ratio is also decreased. If the nitrogen concentration ratio increases above 0.02, undesirable nitrogen oxides are generated.

The discharge tube 1 is in communication with a discharge tube 4 adjacent to the oxygen gas supplying tube 2, and an ozone discharge tube 5 for discharging generated ozone is connected to the discharge tube 4. Since the discharge tubes 1 and 4 reach high temperatures, their surroundings are cooled by cooling water in a cooling water storage container 6. This container 6 is grounded, and a cooling water input tube 7 and a cooling water discharge tube 8 for inputting and discharging cooling water, respectively, are provided on the bottom of the container 6.

In the ozone generating apparatus constructed as mentioned above, the reactions of the following equations (1) to (3) can generate ozone:

$$O_2 + e \rightarrow O_2 \cdot + e \rightarrow 2O + e \ldots \quad (1)$$

$$O + O_2 + M \rightarrow O_3 + M \ldots \quad (2)$$

$$O_2 \cdot + O_2 + \rightarrow O_3 + O \ldots \quad 3)$$

where M is a material functioning as a catalyst; e is energy; and $O_2$ is an oxygen radical. As described above, two kinds of reaction mechanism can be considered in the generation of ozone: (1) oxygen is directly excited by energy, causing ozone to be generated, and (2) ozone is generated by the action of a catalyst M. When highly pure oxygen gas is used as the source gas for the generation of ozone, the concentrations of impurities such as nitrogen, argon, etc., which function as the catalyst M which greatly improves the efficiency of the ozone generation in the abovementioned reaction mechanisms, are small, and therefore the efficiency of the generation of ozone is decreased. If a bottled oxygen gas, whose oxygen purity is slightly lower than a highly pure oxygen gas, is used, since the content of a mixture of nitrogen, etc. differs because of fluctuations in the purity of oxygen, the efficiency of the generation of ozone is not fixed. Therefore, by mixing the nitrogen gas of the above-mentioned predetermined amount with oxygen gas, the efficiency of the ozone generation can be improved, whereby ozone can be stably generated.

Figure 3:
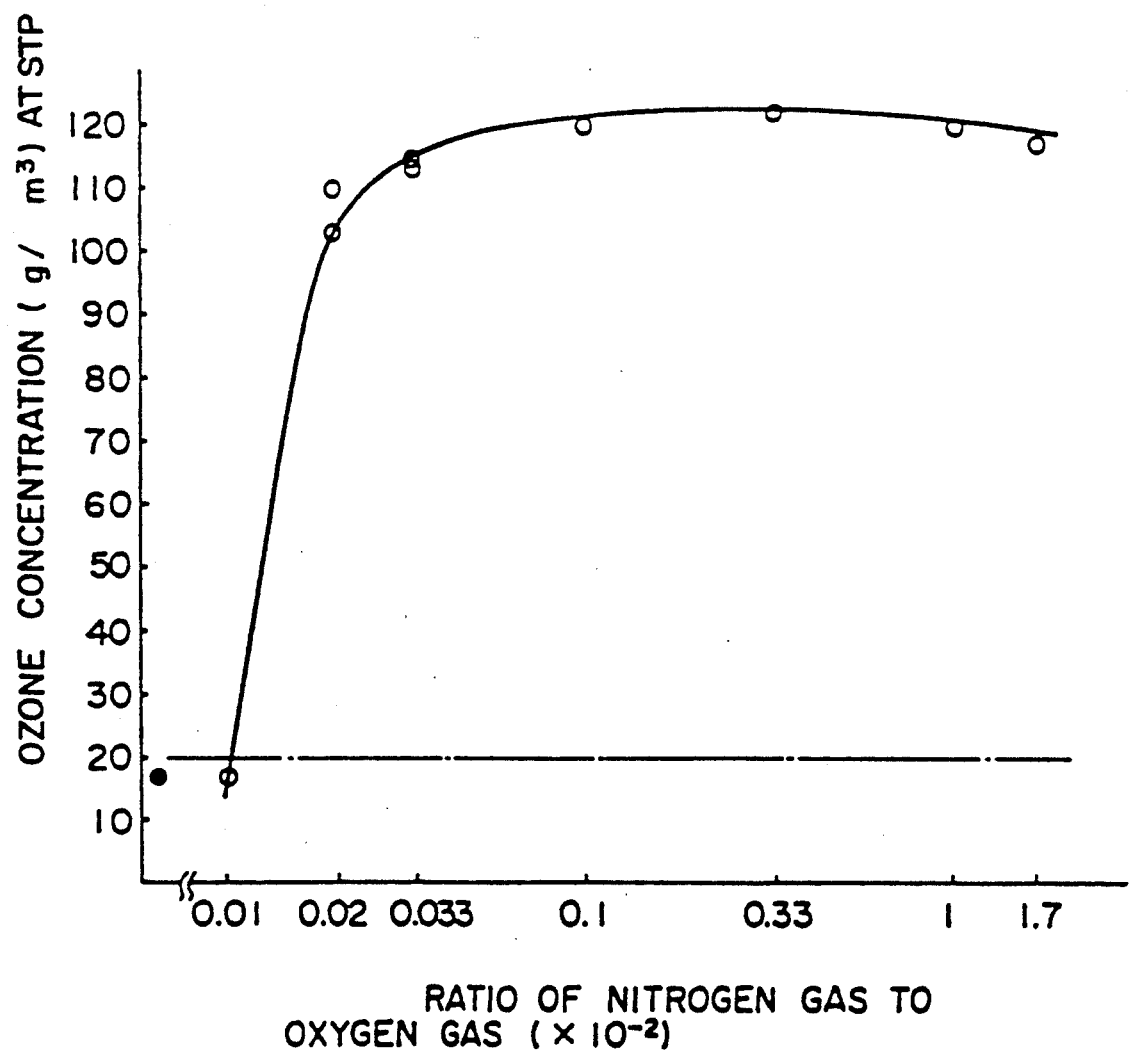
FIG. 3 is a diagram illustrating the relationship between the mixing ratio of nitrogen gas to oxygen gas and the density of generated ozone.

FIG. 3 is a diagram illustrating the relationship between the mixing ratio of nitrogen gas to oxygen gas and the concentration of ozone generated. In this figure, the horizontal axis shows values in which the mixing ratio of nitrogen gas to oxygen gas are converted to values in standard states (0° C., 1 atm), and the vertical axis shows the generated ozone concentration expressed in values at the same standard states. The white circles indicate measurement results in a case where nitrogen gas was mixed, and the black circle indicates measurement results in a case where only oxygen gas was used. A dash-and-dot line indicates the result in a case where argon was used instead of nitrogen.

As apparent from this figure, when the mixing ratio of the nitrogen gas to the oxygen gas is 0.0002 or more, $100 g/m^3$ at standard temperature and pressure of ozone can be generated, and particularly, when the mixture ratio is between 0.001 and 0.02, about $120 g/m^3$ at standard temperature and pressure of ozone can be generated. As explained above, the stable generation of ozone of high density is rendered possible in the range of the mixture ratio of nitrogen to oxygen between 0.0002 and 0.02.

When argon gas was mixed with the oxygen gas in place of the nitrogen gas, the density of generated ozone is $20 g/nm^3$ or thereabouts regardless of the amount of argon mixed, and the ozone generation ratio did not vary when argon gas was mixed with the oxygen gas.

In the above-mentioned embodiment, ozone was generated by silent discharge. However, another method may be employed if oxygen gas is used as a source, and it is used in the same way as the above embodiment.

As many apparently widely different embodiments of the present invention can be made without departing from the spirit and scope thereof, it is to be understood that this invention is not limited to the specific embodiments described but only by as defined in the appended claims.

What is claimed is:

1. A method of increasing the quantity of ozone generated by a silent discharge in high purity oxygen comprising:
   mixing nitrogen with oxygen having a purity exceeding 99.95% in a ratio of nitrogen to oxygen in a range from 0.0002 to 0.02;
   introducing the mixture of nitrogen and oxygen into an ozone generating apparatus; and
   producing a silent discharge in the mixture to generate ozone whereby the quantity of ozone generated is increased over the quantity generated when the ratio of nitrogen to high purity oxygen in the mixture is less than 0.0002 or greater than 0.02.

2. The method of claim 1 including mixing the nitrogen and oxygen in a ratio of 0.001 to 0.02 before introducing the mixture into the ozone generating apparatus.

* * * * *